United States Patent [19]

Waldherr

[11] Patent Number: 5,172,486
[45] Date of Patent: Dec. 22, 1992

[54] FIXTURE FOR TAPE MEASURE

[76] Inventor: Arthur Waldherr, 201 Freeport Dr., Bloomingdale, Ill. 60108

[21] Appl. No.: 898,686

[22] Filed: Jun. 15, 1992

[51] Int. Cl.[5] ............................ B43L 9/04; G01B 3/10
[52] U.S. Cl. .................................... 33/770; 33/27.03; 33/668; 33/768
[58] Field of Search ....................... 33/770, 768, 27.03, 33/668, 42

[56] References Cited

U.S. PATENT DOCUMENTS

| | | | |
|---|---|---|---|
| 3,289,305 | 12/1966 | Norton | 33/770 X |
| 4,103,426 | 8/1978 | Robin | 33/27.03 |
| 4,296,554 | 10/1981 | Hammerstrom | 33/668 X |
| 4,964,225 | 10/1990 | Waldherr | 33/768 |

Primary Examiner—Harry N. Haroian
Attorney, Agent, or Firm—Emrich & Dithmar

[57] ABSTRACT

A fixture for use with a retractable tape measure having a tab at the end thereof perpendicular to the tape. The fixture has a base with opposed side walls at least one of which defines a recess for receiving the tape end tab therein. A retaining member extends over a portion of the for frictionally retaining the tape between the base and the retaining member. A spacer bar extends away from one of the side walls intermediate the tape and the surface on which the fixture rests to protect the surface when the tape and the fixture are moved therealong. A combination of the fixture and a retractable tape measure is also disclosed.

20 Claims, 2 Drawing Sheets

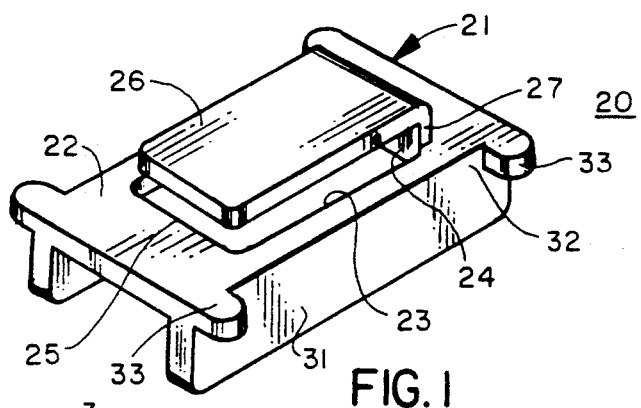
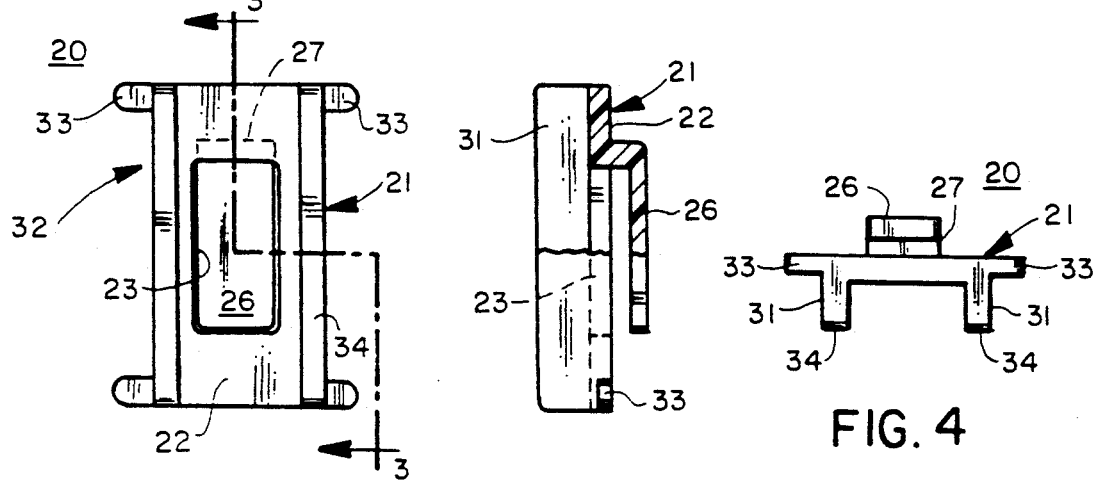
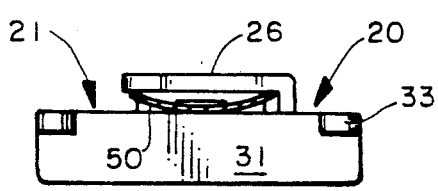
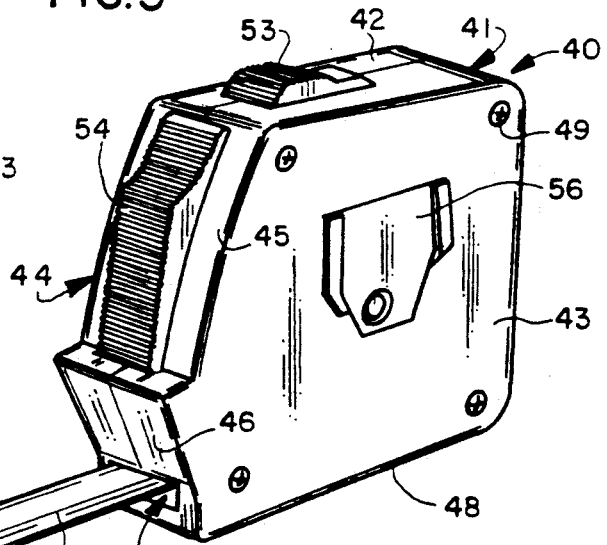
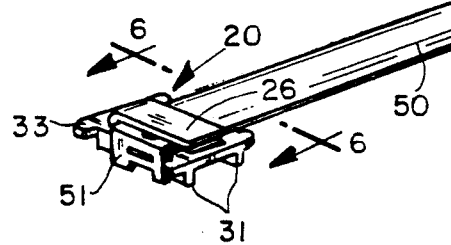

FIXTURE FOR TAPE MEASURE

BACKGROUND OF THE INVENTION

This invention relates to a fixture for use with a retractable tape measure of the type commonly used by carpenters and people who are doing fix-up jobs around the house and the like.

Most retractable tape measures have a spring mechanism inside the tape measure which automatically retracts the tape if it is not locked in an extended position. Often times, particularly for professional carpenters, it is necessary to use the tape to scribe a straight line parallel to an edge of a board or plank or sheet of wood or in some instances, to scribe an arc around a fixed point. In many instances, this is accomplished by the carpenter holding with his hand a pencil or other marking instrument against the side of the tape measure housing, locking the tape measure at a predetermined point and then running the tab at the end of the tape measure along the edge of the work piece to be scribed.

While the foregoing method of scribing lines is satisfactory, it does not always result in a straight line being scribed nor always is it possible to maintain a parallel line since the pencil may move during the act of scribing and in other instances incorrect distances may result because of the pencil being located along the side of the tape measure housing adds anywhere from a quarter of an inch to an inch and a half to the distance read on the tape measure, which difference should be accounted for but often is not.

The present invention relates to a fixture for use with a tape measure and particularly for use with a tape measure having a clip on the side thereof which positions a pencil or other marking utensil in predetermined location with respect to the front of the tape housing which facilitates scribing straight lines as well as scribing arcs and provides a direct reading of the distance between the scribing instrument and the edge of the tape measure.

OBJECTS OF THE INVENTION

Accordingly, it is an object of the present invention to provide an inexpensive fixture for use with a tape measure which permits more accurate scribing of lines and arcs.

Another object of the invention is to provide a fixture which not only provides a direct reading between the scribing instrument and the tape measure but also protects the surface being used as an edge when such surface is a finished surface, such as with laminated wood boards and the like.

Yet another object of the invention is to provide a fixture for use with a retractable tape measure having a tab at the end thereof perpendicular to the tape, comprising a base having opposed side walls at least one of which defines a recess for receiving the tape end tab therein, a retaining member extending over a portion of the base for frictionally retaining the tape between the base and the retaining member, and spacer means extending away from one of the side walls intermediate the tape and the surface on which the fixture rests to protect the surface when the tape and the fixture are moved therealong.

Yet another object of the present invention is to provide in combination, a retractable tape measure having a tab at the end thereof perpendicular to the tape and a fixture for use therewith, the fixture comprising a base having opposed side walls at least one of which defines a recess for receiving the tape end tab therein, a retaining member extending over a portion of the base for frictionally retaining the tape measure between the base and the retaining member, and spacer means extending away from one of the side walls intermediate the tape measure and the surface on which the fixture rests to protect the surface when the tape measure and the fixture are moved therealong, whereby mounting the fixture on the end of the tape measure with the tab received in the recess and the tape measure between the base and the retaining member permits scribing motions with the tape measure and a marking instrument mounted thereon.

A final object of the invention is to provide a combination including a retractable tape measure comprising a housing having opposed side walls a bottom and a front wall having a slot at the bottom thereof, a tape having a tab at the end thereof perpendicular to the tape extending through the slot in the housing front wall, a clip mounted on one of the housing side walls having means for holding a marking instrument, a fixture for use with the tape measure, said fixture comprising a base having opposed side walls at least one of which defines a recess for receiving the tape end tab therein, a retaining member extending over a portion of the base for frictionally retaining the tape measure between the base and the retaining member, and spacer means extending away from one of the fixture side walls intermediate the tape measure and the surface on which the fixture rests to protect the surface when the tape measure and the fixture are moved therealong, whereby mounting the fixture on the end of the tape measure with the tab received in the recess and the tape measure between the base and the retaining member permits scribing motions with the tape measure and a marking instrument mounted thereon.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a first embodiment of the fixture of the present invention;

FIG. 2 is a top elevational view of the fixture illustrated in FIG. 1.

FIG. 3 is a view in partial section of the fixture illustrated in FIG. 2 taken along line 3—3 thereof;

FIG. 4 is a left end elevational view of the fixture illustrated in FIG. 1;

FIG. 5 is a perspective view of a retractable tape measure having various locking mechanisms with a portion of the tape extended and with the fixture of FIG. 1 mounted at the end of the extended portion of the tape;

FIG. 6 is a view in section of the combination retractable tape measure and fixture of FIG. 5 taken along lines 6—6 thereof;

DETAILED DESCRIPTION OF THE INVENTION

Figure 7:
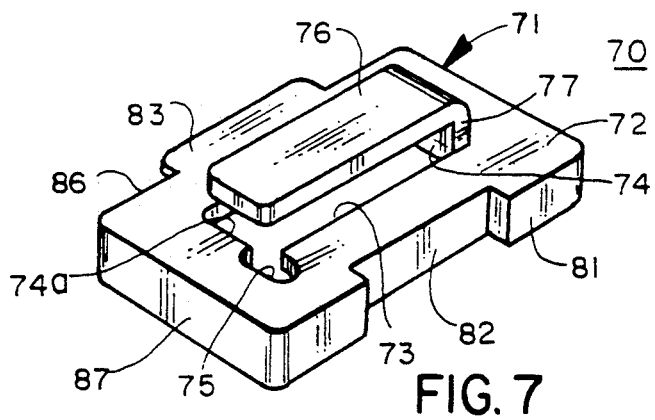
FIG. 7 is a second embodiment of the fixture of the invention.
Figures 8, 9, 10:
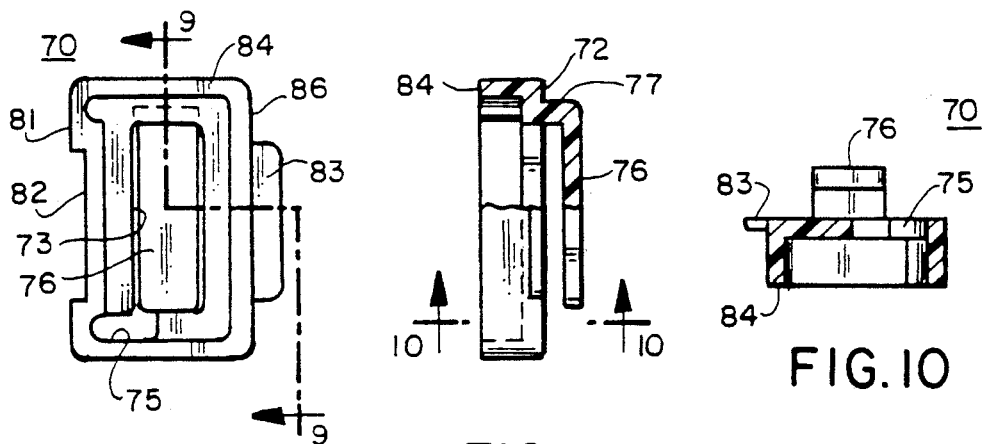
FIG. 8 is a top elevational view of the fixture illustrated in FIG. 7.
FIG. 9 is a view in partial section of the fixture illustrated in FIG. 8 as seen along line 9—9 thereof.
FIG. 10 is a view in section of the fixture illustrated in FIG. 9 as seen along line 10—10 thereof.

Referring now to FIGS. 1—6, there is disclosed the first embodiment of the invention and specifically in FIG. 1, there is shown a fixture 20 which is preferably a single piece of molded plastic 21 having a base 22 with a central rectangularly shaped opening 23 therein having one end edge 24 and another end edge 25. A retaining member 26 is parallel to the base 22 and overlies the rectangularly shaped opening 23 and is connected to the base 22 by means of a vertically extending connecting wall 27.

The fixture 20 and particularly the body 21 thereof also has spaced apart side walls 31 and outwardly extending tabs 33, positioned at each corner of the base 22 and defining a recess area 32 therebetween. Each of the side walls 31 has a thickness defined by the bottom wall thereof 34, as best seen in FIG. 2.

Referring now to FIG. 5, there is disclosed a retractable tape measure of the usual type having a case 40 having a housing 41 including a top wall 42, opposed side walls 43, an interconnecting front wall 44 having an upper portion 45 and a lower portion 46 in which is positioned a slot 47 and a bottom wall 48. As will be noted from the drawing, the tape measure 40 is usually made from two halves which are held together by a plurality of screws 49. Extending outwardly from the housing 41 through the slot 47 is the tape 50 having a downwardly extending tab 51 generally perpendicular to the tape 50. As is known, the tape 50 has indicia marked thereon and increments of at least 1/16 inch. There is normally provided a friction lock 54 on the front wall 45 and in a patent application which is currently pending, disclosing another invention of mine, Ser. No. 840,830, filed Feb. 25, 1992, there is also a positive locking mechanism 53 so as to fix the tape 50 at any specific location, the disclosure of the application being incorporated herein by reference. Finally, there is a clip 56 which may be used to clip the measuring tape 40 on the belt or on a tool holder or the like.

The fixture 20 of the present invention is intended to fit over the tape 50 and particularly adjacent the end tab 51 with the retaining member 26 positioned over the tape and the base 22 positioned under the tape with the tab 51 fitting in the recess 32 formed between the spacer tabs 33. The spacer tabs 33 will fit on top of a surface when a line is being scribed, as hereinafter set forth, in order to protect the surface. This; is a useful feature when the surface is a fine wood which can be scratched. The recesses 32 between the tabs 33 are positioned to help retain the tab 51 in position. Moreover, as will later become apparent, the distance between the outer surfaces of the side walls 31 is a critical distance and is designed specifically in cooperation with the location of a marking instrument, as hereinafter will be described, so as to permit a direct reading of the distance between the end of the tape measure, that is the tab end 51 and the line being scribed.

Referring now to FIGS. 7-11, there is shown a second embodiment of the invention characterized by the fixture 70. Fixture 70 also is preferably constructed from a single piece of plastic forming the body 71 having a base 72 with a rectangularly shaped central opening 73 with a rear edge 74 and a front edge 74a in which a slot 75 is cut in one edge thereof, for a purpose hereinafter set forth. A retaining member 76 is vertically spaced from the surface of the base 72 and overlies the opening 73 and is connected thereto by a rear or connecting wall 77 which is vertically upstanding from the base 72.

The fixture 70 and particularly the body 71 also includes a side wall 81 having a recess 82 positioned centrally thereof in alignment with the central opening 73. A tab 83 extends outwardly from the base 72 in a direction opposite to the recess 82 and is coplanar with the surface of the base 72. There is a bottom wall 84 and a side wall 86 opposite to the side wall 81, the side walls 81 and 86 being interconnected by a pair of end walls 87. In general, the construction of fixture 70 is similar to the construction of fixture 20 with the exception being the presence of the slot 75 and the recess 82 which a difference construction than the recess 32 in the fixture 20. In, addition, the spacer tab 83 is of a different construction than the tabs 33 of fixture 20 which serve the same purpose.

Figure 11:
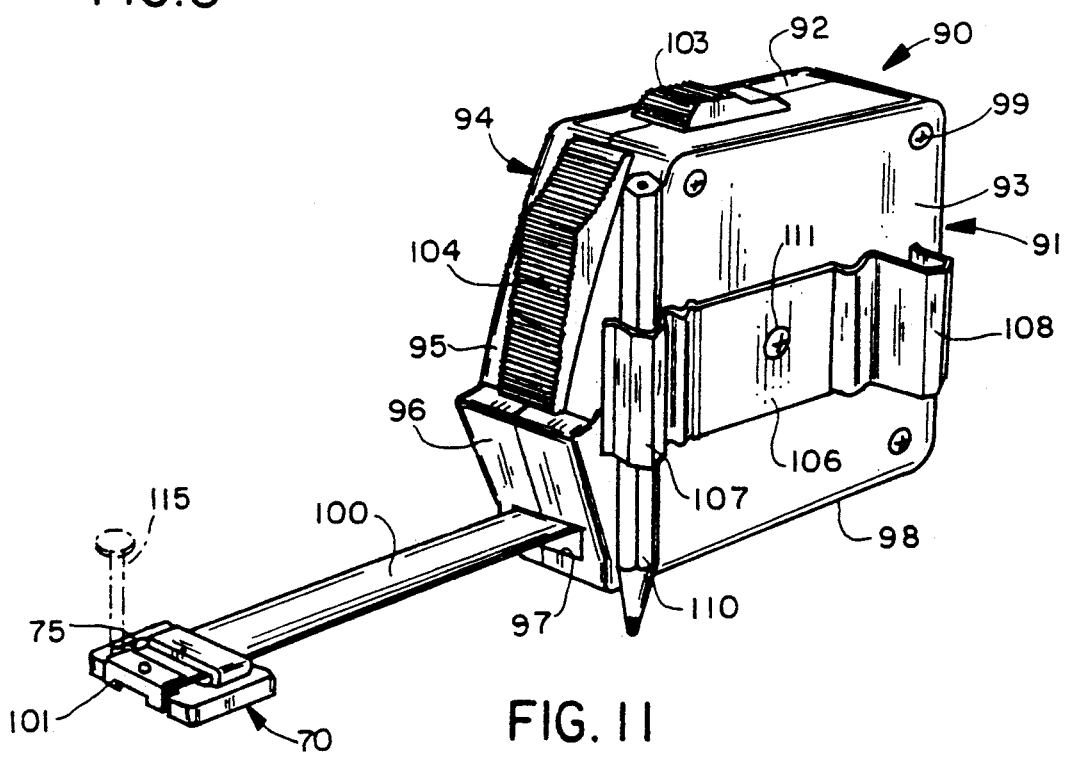
FIG. 11 is a view like FIG. 5 of a retractable tape with a portion of the tape extended and locked and with the fixture of FIG. 7 mounted thereon showing in phantom the use of a nail or other means for scribing an arc or circle.

Referring to FIG. 11, there is disclosed a retractable tape measure 90 having a housing or case 91 of the usual type including a top wall 92, opposed side walls 93 interconnected by a front wall 94. The front wall 94 includes an upper portion 95 and a lower portion 96 in which is a slot 97. A bottom wall 98 connects the front rear walls and the two halves of the housing or case 91 are maintained together by a plurality of screws 99.

A measuring tape 100 extends from a reel inside the housing or case 91 outwardly through the slot 97 and is provided with a perpendicularly positioned and downwardly extending tab 101 at the end thereof. The retractable tape measure 90 is provided with two locking mechanisms, one of those mechanisms 103 being located on the top surface 92 and being a positive lock mechanism whereas the locking mechanism 104 located on the upper portion 95 of the front surface 94 is a frictionally engaging lock mechanism of the usual type.

A clip 106 having a front pencil holder 107 and a rear pencil holder 108 is positioned on one side 93 of the case or housing 91 and maintained therein by a fastener 111. A pencil 110 may be located in the pencil holder 107, as shown, it being understood that the pencil holder may be positioned anywhere between the center of the case at the fastener 111 toward the front end of the case 96 particularly toward the slot 97 where the tape 100 exits the housing. In the phantom or dotted line position, a nail or other kind of fastener 115 is positioned within the slot 75 for a purpose as will be made apparent hereafter.

The purpose of the invention is to permit a carpenter or worker to scribe parallel lines or arcuate lines on a work piece without marring the work piece while at the same time, maintaining an accurate position of the marking utensil or pencil 110 with respect to the edge of the work piece. In order to perform this task, the fixture 20 or 70 is used in connection with the tape measure 40 or 90. As illustrated, the fixture 20 or 70 is located at the distal end of the tape 50 or 100 near the associated tab 51 or 101. The distance between the side walls 31 for the fixture 20 and between the recess 82 and side wall 86 for the fixture 70 should be equal to the distance from the marking end of the pencil 110 and the slot 47 or 97 which serves to indicate the measuring indicia on the tape. The reason for this is that making these two distances equal will enable the carpenter or user of the combination of the invention to have a direct reading on the tape 50, 100 which corresponds to the distance between the edge of the work piece and the marker 110 which makes the job of the carpenter or user easier because no substraction or alteration in the measurement that he sees is required. In addition, the fixture 70 is advantageous in that the slot 75 is useful for enabling the carpenter or user of the tape measure 90 to scribe arcs or circles by nailing or otherwise fixing the slot 75 with respect to the measuring, and then scribing around the fixed location in any degree of arc required.

Another feature of the invention is the presence of the tabs or spacers 33 on fixture 20 and the spacer 83 on fixture 70 which serves to protect the work piece in the event that parallel lines are being scribed on the work piece and it is of the type that is finished like formica or even a piece of wood which has some kind of laminated or finished surface. If the tab 51 or 101 as noted from the drawings and particularly FIG. 6, the camber of the tape 50 and 100 in combination with the distance between the retaining member 26 and 76 with respect to the surface of the base 22 and 72, respectively, is such to frictionally engage the tape and to retain the tape in place with respect to the fixture so that the fixture 20 or 70 does not slide up and down the tape 50 or 100.

While there has been disclosed what is considered to be the preferred embodiments of the present invention, it is understood that various changes in the details may be made without departing from the spirit, or sacrificing any of the advantages of the present invention.

I claim:

1. A fixture for use with a retractable tape measure having a tab at the end thereof perpendicular to the tape, comprising a base having opposed side walls at least one of which defines a recess for receiving the tape end tab therein, a retaining member extending over a portion of said base for frictionally retaining the tape between the base and said retaining member, and spacer means extending away from one of said side walls intermediate the tape and the surface on which the fixture rests to protect the surface when the tape and said fixture are moved therealong.

2. The fixture of claim 1, wherein the spacer means is a tab extending outwardly from the top of said base.

3. The fixture of claim 1, wherein the fixture is a single piece of plastic.

4. The fixture of claim 1, wherein said base has a rectangular aperture in it in registry with said retaining member.

5. The fixture of claim 4, wherein said retaining member is spaced from said base and lies in a plane parallel to the plane defined by the top surface of said base.

6. The fixture of claim 2, wherein said spacer means are spaced apart tabs.

7. The fixture of claim 2, wherein said spacer means is a single tab extending outwardly from said base from the side opposite to said recess.

8. In combination, a retractable tape measure having a tab at the end thereof perpendicular to the tape and a fixture for use therewith, said fixture comprising a base having opposed side walls at least one of which defines a recess for receiving said tape end tab therein, a retaining member extending over a portion of said base for frictionally retaining said tape measure between said base and said retaining member, and spacer means extending away from one of said side walls intermediate said tape measure and the surface on which said fixture rests to protect the surface when said tape measure and said fixture are moved therealong, whereby mounting said fixture on the end of said tape measure with said tab received in said recess and said tape measure between said base and said retaining member permits scribing motions with said tape measure and a marking instrument mounted thereon.

9. The fixture of claim 8, wherein the spacer means is a tab extending outwardly from the top of said base.

10. The fixture of claim 9, wherein said spacer means are spaced apart tabs.

11. The fixture of claim 9, wherein said spacer means is a single tab extending outwardly from said base from the side opposite to said recess.

12. The fixture of claim 8, wherein said base has a rectangular aperture in it in registry with said retaining member.

13. The fixture of claim 12, wherein said retaining member is spaced from said base and lies in a plane parallel to the plane defined by the top surface of said base.

14. The fixture of claim 8, wherein said base has a second aperture therein for receiving a pin or nail to allow said fixture to be pivoted around the center of said second aperture.

15. A combination including a retractable tape measure comprising a housing having opposed side walls a bottom and a front wall having a slot at the bottom thereof, a tape having a tab at the end thereof perpendicular to the tape extending through the slot in the housing front wall, a clip mounted on one of said housing side walls having means for holding a marking instrument, a fixture for use with said tape measure, said fixture comprising a base having opposed side walls at least one of which defines a recess for receiving said tape end tab therein, a retaining member extending over a portion of said base for frictionally retaining said tape measure between said base and said retaining member, and spacer means extending away from one of said fixture side walls intermediate said tape measure and the surface on which said fixture rests to protect the surface when said tape measure and said fixture are moved therealong, whereby mounting said fixture on the end of said tape measure with said tab received in said recess and said tape measure between said base and said retaining member permits scribing motions with said tape measure and a marking instrument mounted thereon.

16. The combination of claim 15, wherein a marking instrument is mounted in said clip and has the marking end thereof in the plane of said housing.

17. The combination of claim 16, wherein the distance from the marking instrument end to the housing front wall is equal to the distance between the fixture surface against which rests the tape end tab and the opposed side wall to permit a direct reading on the tape measure of the distance between the marking utensil and the tape end tab.

18. The combination of claim 17, wherein said spacer means are spaced apart tabs.

19. The combination of claim 17, wherein said spacer means is a single tab extending outwardly from said base from the side opposite to said recess.

20. The combination of claim 15, wherein said fixture has a second aperture therein for receiving a pin or nail to permit said fixture and said tape and marking instrument to be moved in an arc around said pin or nail.

* * * * *